(12) United States Patent
Curry

(10) Patent No.: US 7,359,091 B2
(45) Date of Patent: Apr. 15, 2008

(54) MULTI-BIT OUTPUT SAMPLED THRESHOLD ARRAY HALFTONER

(75) Inventor: Douglas N. Curry, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 1045 days.

(21) Appl. No.: 10/248,384

(22) Filed: Jan. 15, 2003

(65) Prior Publication Data

US 2004/0136034 A1    Jul. 15, 2004

(51) Int. Cl.
*H04N 1/40* (2006.01)
*H04N 1/405* (2006.01)
*G06K 15/00* (2006.01)

(52) U.S. Cl. .................. 358/3.06; 358/3.01; 358/3.1; 358/3.13

(58) Field of Classification Search .......... 358/3.01, 358/3.06, 3.09, 3.1, 3.11, 3.13, 3.17
See application file for complete search history.

(56) References Cited

U.S. PATENT DOCUMENTS

| 5,410,414 A | 4/1995 | Curry ................ 358/3.23 |
| 5,557,709 A | 9/1996 | Shu |
| 5,732,162 A | 3/1998 | Curry ................ 382/294 |
| 5,875,268 A * | 2/1999 | Miyake ................ 382/276 |
| 6,172,773 B1 | 1/2001 | Ulichney |
| 6,208,430 B1 | 3/2001 | Hains et al. ............ 358/1.9 |
| 6,809,840 B1 * | 10/2004 | Yu et al. ............. 358/3.06 |
| 7,031,025 B1 * | 4/2006 | He et al. ............. 358/3.09 |
| 7,126,723 B1 * | 10/2006 | Yamamoto ............ 358/3.3 |
| 2003/0081258 A1 * | 5/2003 | Sugizaki ............ 358/3.14 |

FOREIGN PATENT DOCUMENTS

EP    0 707 412 A2    4/1996

OTHER PUBLICATIONS

U.S. Appl. No. 09/681,967, filed Jun. 29, 2001.

* cited by examiner

*Primary Examiner*—David Moore
*Assistant Examiner*—James A. Thompson
(74) *Attorney, Agent, or Firm*—Oliff & Berridge, PLC

(57) ABSTRACT

Xerox Reference No. D/A0639A system and method for improving xerographic halftoning by magnifying a threshold array, interpolating the in-between values, enabling multiple thresholds to be accessed simultaneously and presented to multiple comparators, to cause multi-bit output. A threshold array is sampled at distinct locations separated by the sparse sampling distance to allow warping of the threshold array dots by adjusting the sampling distance in small, fractional portions (deltas) of the magnified distance. By adding more thresholds, amplitude or intensity modulation is used to move dot edges in a process direction for further flexibility in printing irrational or warpable screens.

39 Claims, 17 Drawing Sheets

| 0 | 0 | 0 | 0 | 0 | 0 | 0 | 0 | 0 | 0 |
|---|---|---|---|---|---|---|---|---|---|
| 0 | 0 | 0 | 0 | 1 | 1 | 0 | 0 | 0 | 0 |
| 0 | 0 | 0 | 1 | 1 | 1 | 1 | 0 | 0 | 0 |
| 0 | 0 | 1 | 1 | 1 | 1 | 1 | 1 | 0 | 0 |
| 0 | 0 | 1 | 1 | 1 | 1 | 1 | 1 | 0 | 0 |
| 0 | 0 | 1 | 1 | 1 | 1 | 1 | 1 | 0 | 0 |
| 0 | 0 | 1 | 1 | 1 | 1 | 1 | 1 | 0 | 0 |
| 0 | 0 | 0 | 1 | 1 | 1 | 1 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |

1,1,0 BINARY TRIPLET 1,0,0

FIG. 4

|    | | | | | | | | | | |
|----|---|---|---|---|---|---|---|---|---|---|
| B0 | 0 | 0 | 0 | 0 | 0 | 0 | 0 | 0 | 0 | 0 |
| C0 | 0 | 0 | 0 | 0 | 1 | 1 | 0 | 0 | 0 | 0 |
| A1 | 0 | 0 | 0 | 1 | 1 | 1 | 1 | 0 | 0 | 0 |
| B1 | 0 | 0 | 1 | 1 | 1 | 1 | 1 | 1 | 0 | 0 |
| C1 | 0 | 0 | 1 | 1 | 1 | 1 | 1 | 1 | 0 | 0 |
| A2 | 0 | 0 | 1 | 1 | 1 | 1 | 1 | 1 | 0 | 0 |
| B2 | 0 | 0 | 1 | 1 | 1 | 1 | 1 | 1 | 0 | 0 |
| C2 | 0 | 0 | 0 | 1 | 1 | 1 | 1 | 0 | 0 | 0 |
| A3 | 0 | 0 | 0 | 0 | 1 | 1 | 0 | 0 | 0 | 0 |
| B3 | 0 | 0 | 0 | 0 | 0 | 0 | 0 | 0 | 0 | 0 |

MULTI-BIT OUTPUT SAMPLED THRESHOLD ARRAY HALFTONER

BACKGROUND OF THE INVENTION

1. Field of Invention

This invention relates to systems and methods for generating binary irrational halftone dots.

2. Description of Related Art

When creating image regions using halftoning, binary clustered halftone dots are desirable. In particular, binary clustered halftone dots often produce the least amount of noise and the best highlights. Conventional halftoning adds a two-dimensional, spatially periodic, dot screen or line screen structure to the images to be halftoned. Typically, the same screen, or at least a number of essentially identical screens, are used to halftone each of the color image separation layers of a polychromatic, i.e., color, image. The halftone screens are oriented at different angles for printing the respective halftone color image separation layers.

Conventional halftoning methods, such as those disclosed in U.S. Pat. No. 5,410,414 to Curry, incorporated herein by reference in its entirety, warp, i.e., adjust or move, the image data produced by an image data generator to improve image characteristics, including registration. Such image data generators include gray scale image generators and binary image generators. However, merely warping the image data to improve image characteristics, including registration, results in offsets with the image data which have no corresponding offsets or warp in the halftone screens used to render color image separation layers.

Improving registration characteristics in halftone images conventionally includes also warping one or more of the halftone screens in a halftone screen system to correspond to the warping of the image data. This is disclosed in greater detail in U.S. Pat. No. 5,732,162 to Curry, incorporated herein by reference in its entirety. The 162 patent provides a detailed discussion of warping both image data and halftone screens.

A technique for reducing moire in halftone images includes generating binary clustered irrational halftone dots, for example, by adjusting halftone dot cluster size, is disclosed in U.S. Pat. No. 6,798,541, which is incorporated herein by reference in its entirety. The technique disclosed in the 541 Patent achieves reduced moire halftone images.

One common stimulus used by various halftone image forming apparatus to form images is a light beam scanned by a raster output scanner (ROS). A raster output scanner scans one or more such light beams across a photoreceptor drum or belt. In general, the raster output scanner scans each of the light beams across the photoreceptor drum or belt in a fast scan direction, while the photoreceptor drum or belt simultaneously moves relative to the scanned light beam in a slow scan direction.

As the one or more light beams are scanned across the photoreceptor drum or belt in the fast scan direction, the one or more light beams are individually modulated between off and on at a high rate. In particular, in various known high addressability systems, each light beam is modulated at a rate that is some integer multiple of, such as, for example, four or eight times, the period it takes the raster output scanner to move the one or more light beams a distance along the fast scan direction that is equal to the diameter of the light beams. This is known as 4× high addressability. As described in U.S. Pat. No. 6,208,430, which is incorporated herein by reference in its entirety, 4× or 8× high addressability allows the location at which the one or more light beams are turned on Thus, as a result, edges of image structures that are substantially perpendicular to the fast scan direction can be spatially controlled to one-quarter or one-eighth, respectively, of the diameter of the light beam along the fast scan direction.

However, for the process direction, the center-to-center spacing of two adjacent light beams or of two adjacent scans of a single light beam are offset by the diameter of the one or more light beams. That is, such scans, and thus of edges of image structures that are substantially parallel to the fast scan direction , cannot be offset by some integer fraction, such as ¼ or ⅛, of the diameter of the light beam in the fast scan direction. Therefore, when the edges of an image structure, such as a halftonedot, extend in directions that are substantially aligned with the fast scan direction, the light beam cannot merely be turned on when the current scan of the light beam intersects with the almost collinear image structure, such as a halftone dot, and left on until the light beam no longer intersects the image structure. Doing so would result in a significant error in the toner being applied to the resulting developed image at that area. This would result in that portion of the image having an image density that significantly departs from the desired image density represented by the image structure, such as the halftone dot.

Conventionally, intensity modulation is used to avoid this error in image density. In intensity modulation, the edge of the image structure, such as the halftone dot, extends along the fast scan direction, can be "dithered", i.e., modulated, at a very high rate, so that the actual amount of image density of the developed image more closely corresponds to the image density of the overall image structure, such as the halftone dot.

SUMMARY OF THE INVENTION

Traditional threshold array halftoning is implemented so that incrementing from pixel to pixel is done with integer increments on adjacent memory boundaries. If the halftone cell is to be sampled at something other than an integer increment, for example, 0.9, then every tenth increment will result in an advance of zero (0). For example, an advance from 9.0 to 9.9 would still be located within cell No. 9. Thus, the same threshold analysis would occur, resulting in the same data for the current halftone pixel as in the previous halftone pixel. This results in a quantization error which constitutes a large percentage of the advance. Accordingly, it is easy for an observer to see this error as an artifact such as, for example, a moire pattern or noise.

This invention provides systems and methods that improve halftoning by magnifying a threshold array.

This invention separately provides systems and methods for interpolating values located in between the magnified halftone array.

This invention separately provides systems and methods that permit a single threshold to be accessed and presented to single threshold comparators to cause single-bit output.

This invention separately provides systems and methods that permit multiple thresholds to be accessed and presented to multiple comparators to cause multi-bit output.

This invention separately provides systems and methods that sample a threshold array at distinct locations separated by a magnified distance.

This invention separately provides systems and methods that create a threshold array at a sampling resolution that is higher than the resolution of the image.

This invention separately provides systems and methods that sub-sample the threshold array at the resolution of the image.

This invention separately provides systems and methods that allow warping of threshold array dots by adjusting sample distance in small, fractional increments of a magnified distance.

This invention separately provides systems and methods that add thresholds so that amplitude or intensity modulation can be used to move edges in the slow scan or process direction for further flexibility in printing irrational or warpable screens.

In various exemplary embodiments of the systems and methods according to this invention, incrementing from pixel to pixel is enlarged. In one exemplary embodiment, the enlarged increment is an integer, such as, for example, 10. Incrementing at a non-integer value, such as, for example, 9.9 would result in every tenth increment having a quantization error as set forth above, where the increment was 0.9. However, incrementing at 9.9 results in an error which was one tenth less than if the increment were 0.9. For example, incrementing from 99.0 to 108.9 would result in an advance of 9 memory locations instead of 10. This results in a much smaller error, and is more difficult for an observer to detect as an error.

In various exemplary embodiments of the systems and methods of this invention, a number of replications of the threshold array are stored in memory so that the threshold values for several high addressability pixels can (for example, along the fast scan direction) be accessed in parallel to overcome to some degree memory speed limitations.

In various exemplary embodiments of this invention, a halftone table is magnified by some factor to obtain a larger increment, such as, for example, 10. Interpolated values are then filled in for the intermediate locations. The halftone table is then sampled at near the magnified rate, e.g., near 9.9, 10.0 or 10.1. This results in reducing quantization errors by the same factor, while the fraction of variation of sampling rate from the nominal value allows warping of the halftone screen.

These and other features and advantages of this invention are described in, or are apparent from, the following description of the systems and methods according to this invention.

BRIEF DESCRIPTION OF THE DRAWINGS

Various exemplary embodiments of this invention will be described in detail, with reference to the following figures, wherein:

FIG. 4 shows a combined lookup table sampled on nominal 3×3 centers, skipping over unused halftone memory locations and the memory content of a halftone memory location;

FIG. 6 shows a combination of the light beam scan phases A, B and C of FIG. 5;

FIG. 7 shows a halftone dot and light beam scan phases L and M in the fast scan direction on a stationary grid with a magnification of 3.

Figure 5:
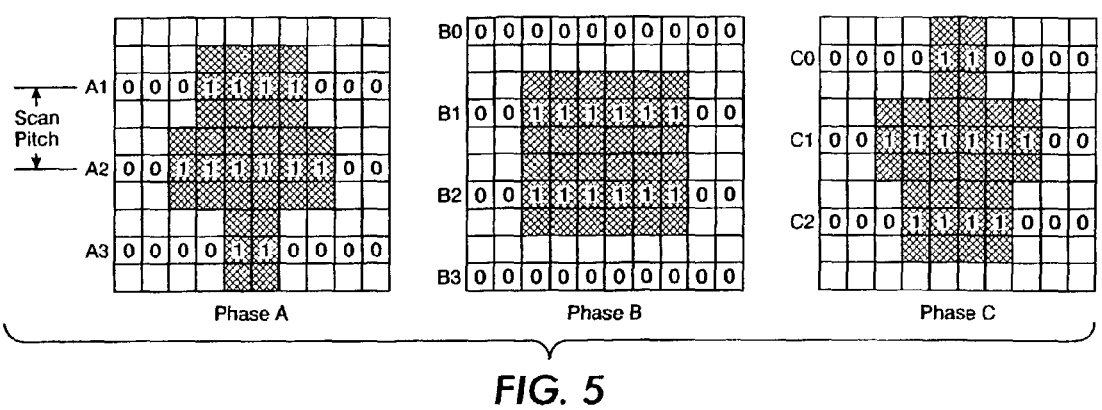
FIG. 5 shows a halftone dot and light beam scan phases A, B and C in the process direction on a stationary grid with a magnification of 3.
Figure 7:
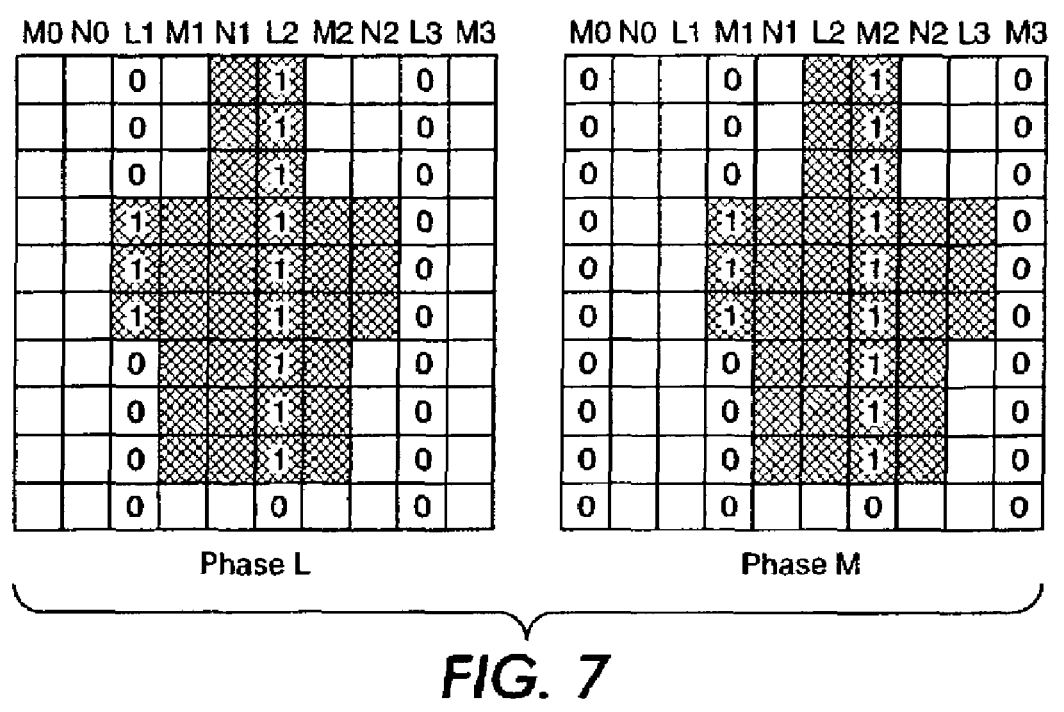
Figure 8:
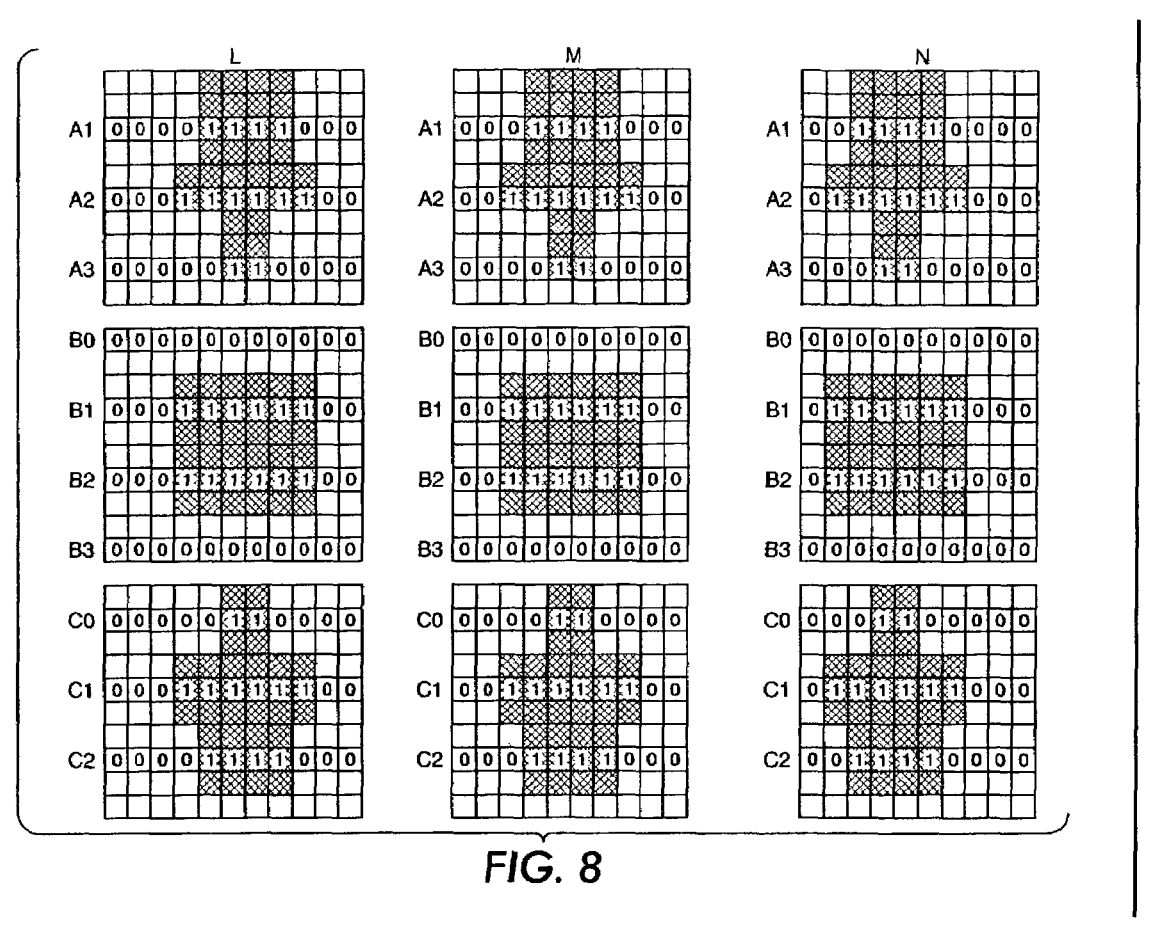

The rows of FIG. 8 show views of light beam scan phases A1-A3, B1-B3 and C1-C3, as in FIG. 5, in the slow scan direction and the columns show separate fast scan phases as in FIG. 7.

Figure 9:
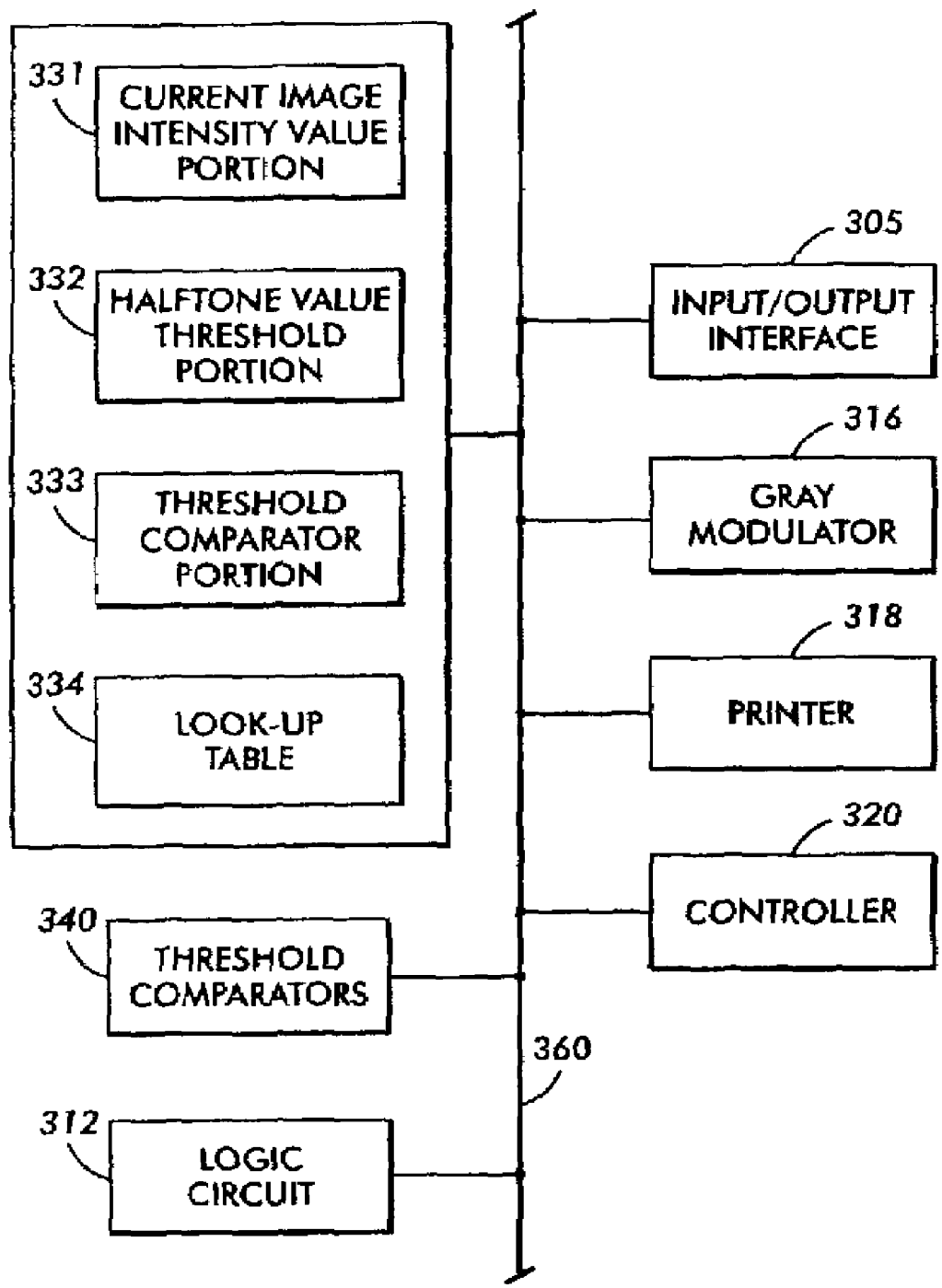
Figure 10:
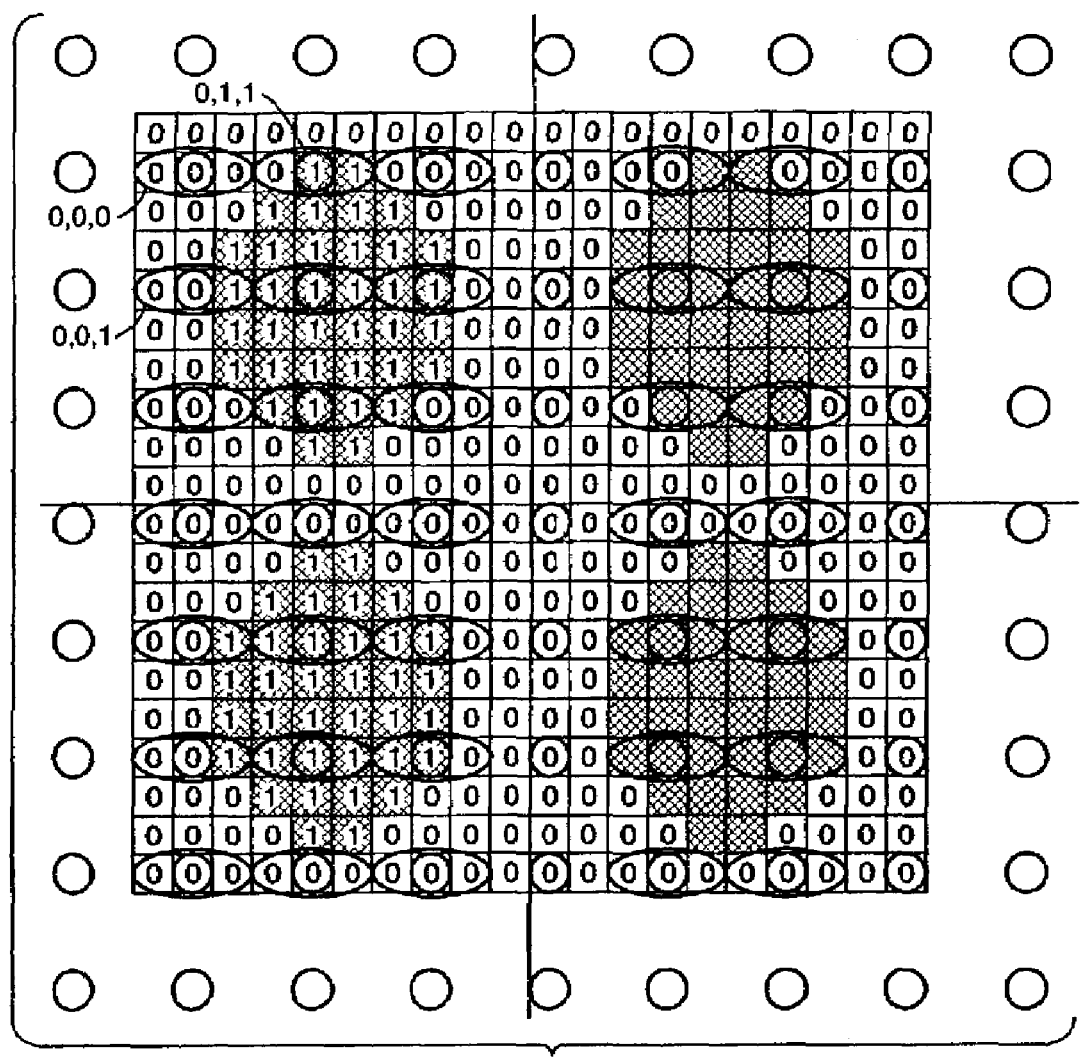
Figure 11:
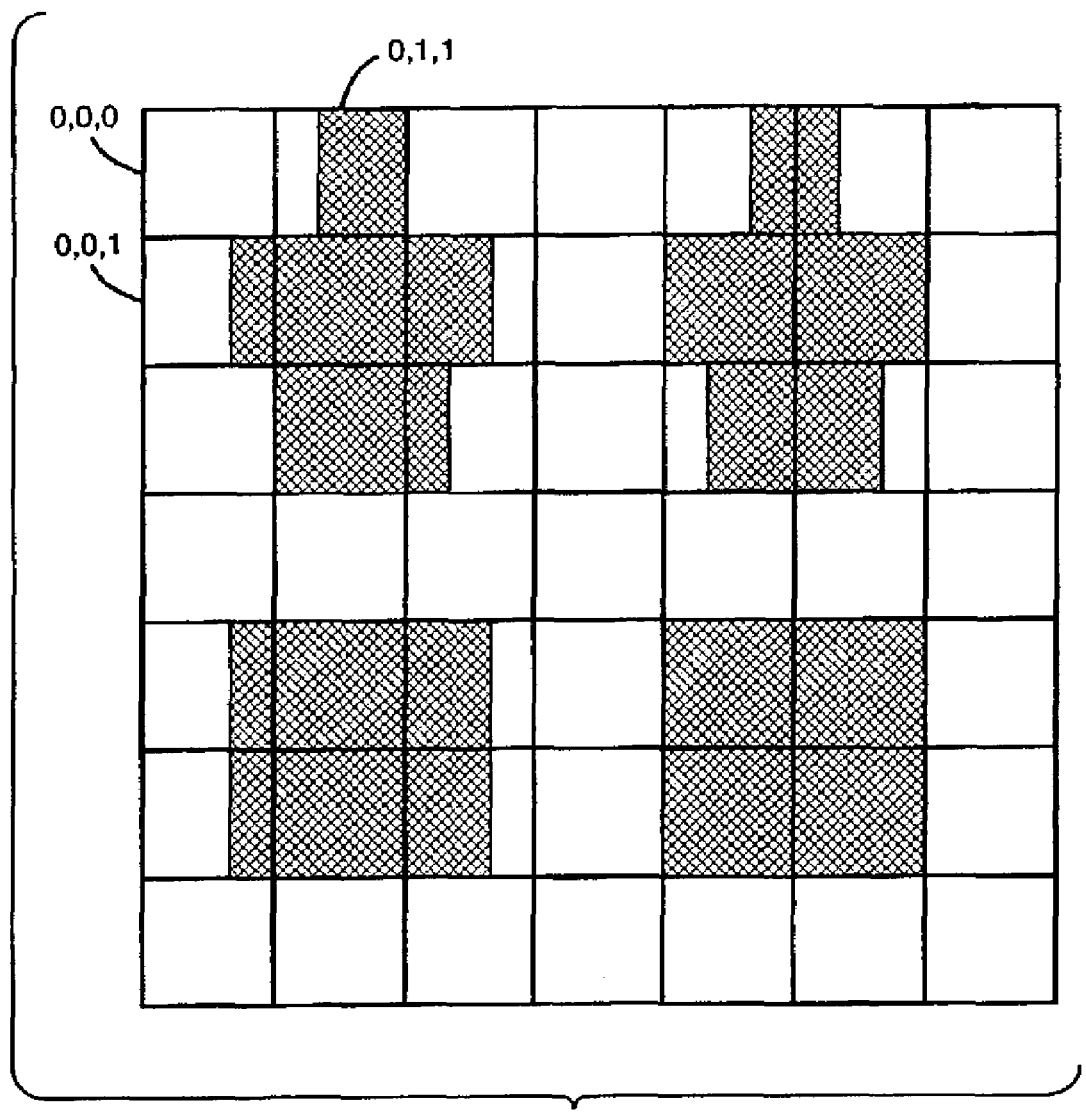
Figure 12:
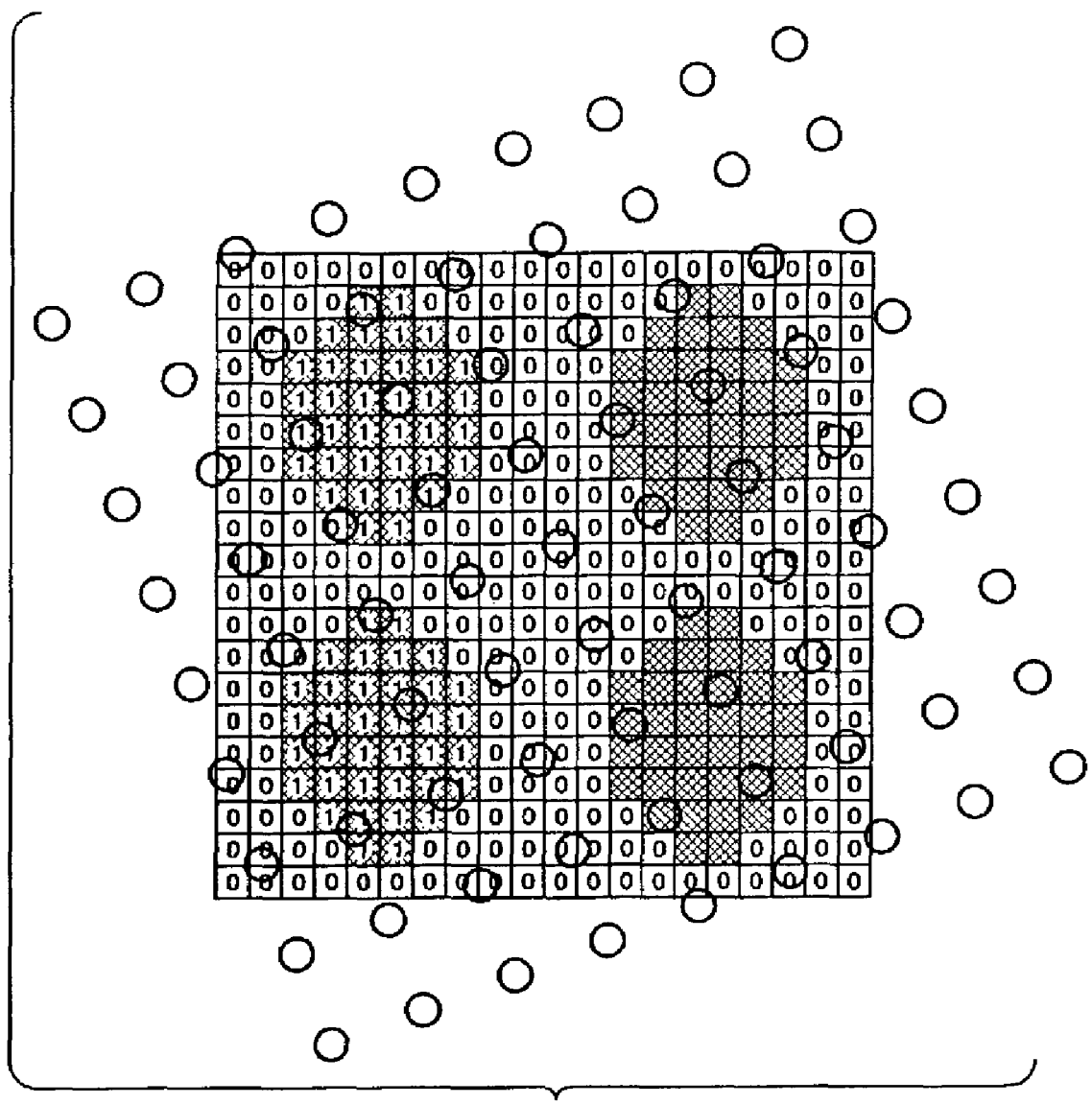
Figure 13:
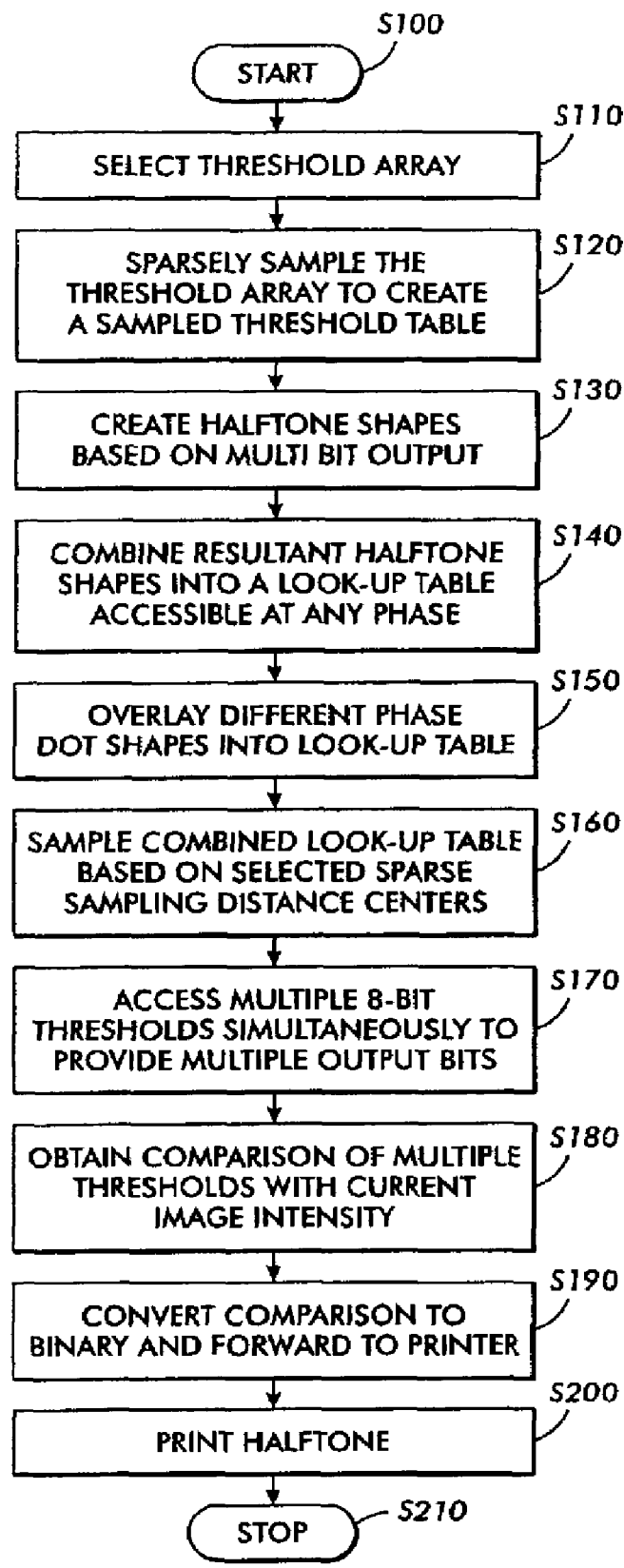
Figure 14:
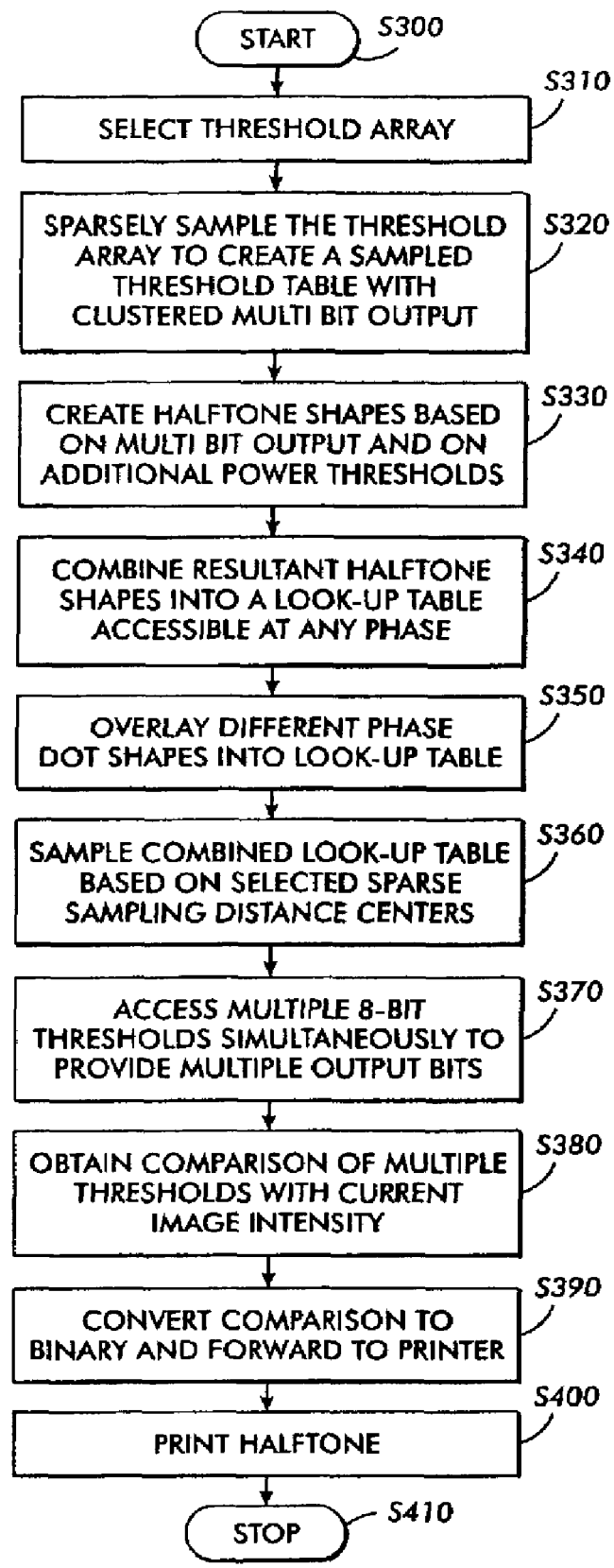
Figure 16:
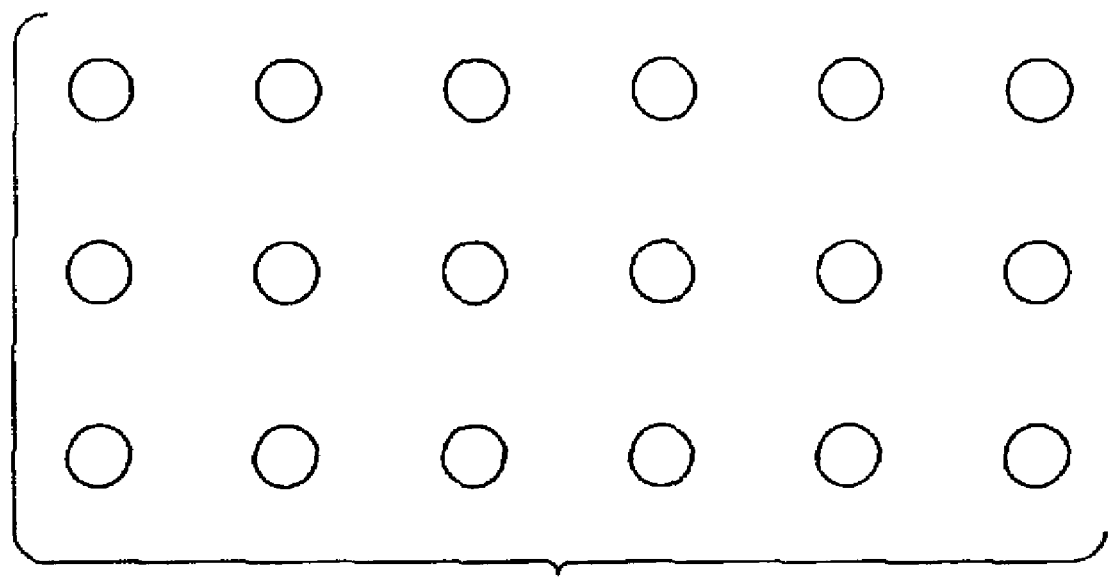
Figure 17:
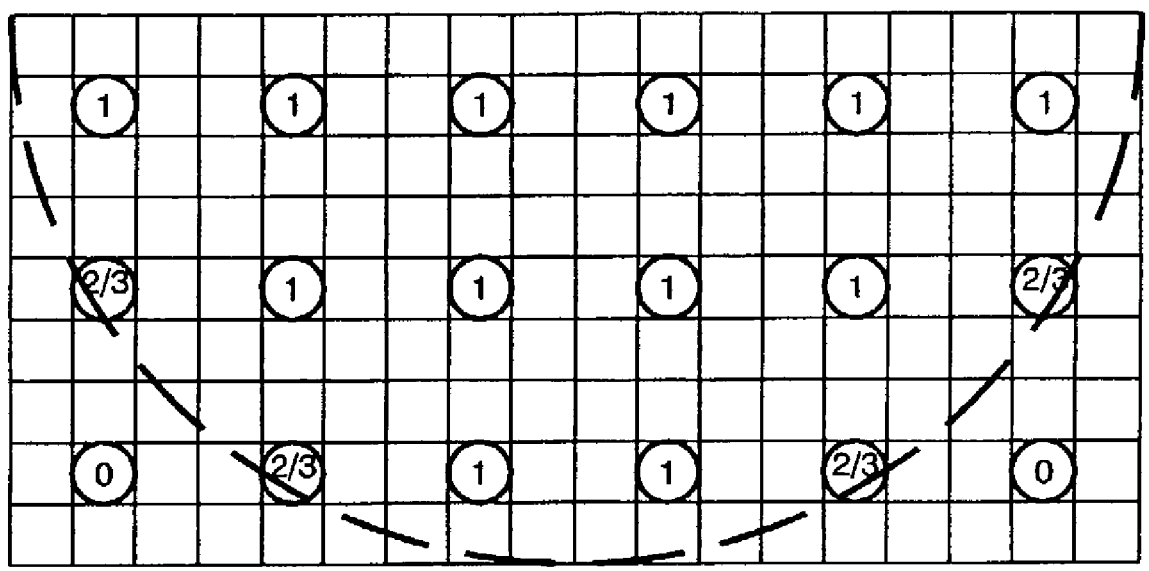

FIG. 9 is a block diagram of one exemplary embodiment of a binary clustered irrational halftone dot generating system according to this invention;

FIG. 10 shows a lookup table (LUT) sampling grid which samples four periods of a LUT halftone dot at different phases;

FIG. 11 shows the gray modulator output based on the LUT sampling of FIG. 9;

FIG. 12 shows a LUT sampling grid rotated at an arbitrary angle;

FIG. 13 is a flowchart outlining a first exemplary embodiment of a method according to this invention;

FIG. 14 is a flowchart outlining a second exemplary embodiment of a method according to this invention;

Figure 15:
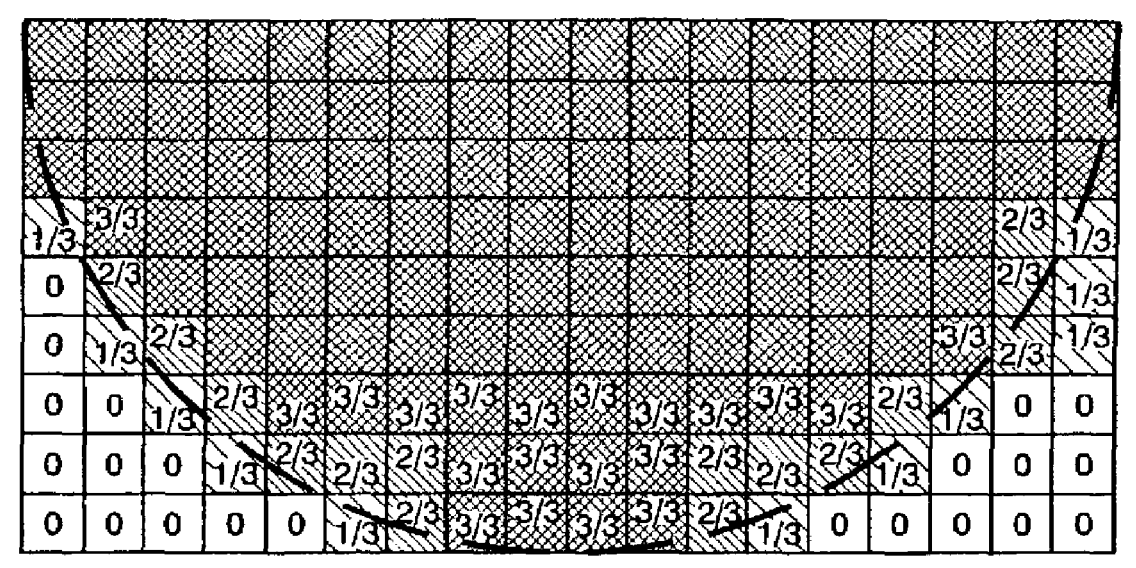

FIG. 15 shows an exemplary embodiment of a halftone dot formed using amplitude or intensity modulation in a threshold array halftoner using plural thresholds FIG. 16 shows a sampling grid that samples/hits one out of nine LUT memory locations.;

FIG. 17 shows an exemplary embodiment of the sampling grid of FIG. 16 overlaid on the LUT memory to create FIG. 15.

DETAILED DESCRIPTION OF EXEMPLARY EMBODIMENTS

It should be appreciated that, in the preceding discussion, and throughout this disclosure, the discussed exemplary embodiments use a flying spot raster output scanner. In such raster output scanners, "horizontal" refers to the fast scan direction, while "vertical" refers to the slow scan direction. While the following discussion will generally use the terms horizontal and vertical to refer to the fast and slow scan directions, respectively, it should be appreciated that there are other types of exposure systems and imagers, such as LED light bar printers or ink jet printers, that switch the directions, so that it may be more convenient in such systems to refer to the fast scan direction as the "vertical" direction and the slow scan direction as the "horizontal" direction. For ease of understanding, the following discussing will use the terms "horizontal" and "vertical" relative to the fast and slow scan directions, respectively. However, those of ordinary skill in the art will readily be able to determine those systems where the horizontal, rather than the vertical, edges will be aligned with the slow scan direction.

Electronic registration refers to adjusting the spatial positions on the image substrate that the image structures, such as the halftone dots, will be placed by the image forming apparatus to compensate for any physical offsets in the image forming apparatus that would otherwise result in misregistration between the color separation layers. That is, rather than physically, i.e., mechanically, ensuring that the color separation layers are precisely aligned, the various offsets between the various color separation layers are measured. The electronic data is then electronically adjusted to change the spatial locations of the resulting image structures, so that the resulting image structures of each corresponding color separation layer are properly aligned. Being able to move or warp an image structure such as halftone dots without causing moiré patterns or noise that detract from the image quality will increase the utility of electronic registration.

Dithering the edges of an image structure, such as a halftone dot, that extend horizontally along the fast scan direction can help capture the image density to be represented by the image structure, such as the halftone dot. However, such high-frequency structures along the edges of the image structure, such as the halftone dot, often, result in artifacts, such as moiré patterns or noise, when the halftone dots are moved to accomplish electronic registration or rotated to produce irrational screens.

In general, in a high resolution image forming apparatus, the halftone dots may formed with a shaper, which may be implemented in software or hardware or a combination of both, using a dot-shaped function that varies the shape of the halftone dot based on the intensity level and the spatial coordinates to be reproduced.

It should appreciated that the dot-shaped functions can have infinite fidelity, such as when the dot shaped function are based upon sine and cosine functions, for instance.

This invention is directed to systems and methods used to improve halftoning by magnifying a threshold array or setting a sampling distance for a threshold array to a distance greater than one. Values within the magnified threshold array are interpolated from the dot-shape functions.

The use of the term magnified refers to the fact that threshold arrays are typically accessed by incrementing a threshold array location by one, either in the fast or slow direction as printing progresses. A magnified threshold array, in contrast, is accessed by an increment corresponding to the magnification factor, such as 3, 3.1 or 10. This can also be called a sparse sampling distance.

A magnified array can also be thought of as an array that can be sub-sampled at the magnification factor. The use of the term "magnified" also helps teach that there is more information in the threshold array that is skipped over during one pass, (while incrementing by 3, 3.1 or 10, for instance), only to be accessed at later times during subsequent passes. Thus, the new threshold array is rich in information for forming halftone dots, and only requires sub sampling or sparse sampling to produce full fidelity halftone dots.

Since two dimensional array accesses are discussed, and this can be within a rotated coordinate system with respect to the pixel scan line coordinate system, the x and y components of the magnified increments will correspond the cosine and sine of the access angle, and the hypotenuse length will correspond to the magnification factor or sparse sampling distance.

Even in the rotated case, there is no need to hold the x and y increments to integers, which would have the adverse impact of limiting rotation angels to the arc tangent of rational numbers. This would exclude most angles, such as 30 degrees, which is the arc tangent of one over the square root of 3. These screens, enabled by this invention, are called irrational screens because their angles correspond to the arc tangent of an irrational number.

Finally, the use of the term warp refers to varying the access increments or sparse sampling distance by small amounts within the print area to account for subtle deformations in the printing hardware or image data, where the image must be deformed to achieve electronic registration or other spatial compensation operations. For instance, an access increment might vary from 3.10 to 3.12 to 3.15 during three consecutive halftone memory accesses. See U.S. Pat. No. 5,732,162, "Two Dimensional Linearity and Registration Error Correction In A Hyperacuity Printer," and U.S. Pat. No. 5,410,414, "Halftoning In A Hyperacuity Printer," incorporated herein by reference in their entirety, for a more complete discussion of image warping and how it relates to electronic registration and fractional halftone array access increments.

It should be appreciated that generating the new values of the magnified sampling distance threshold array by interpolation permits multiple thresholds to be accessed and presented to multiple comparators to cause multi-bit output. This invention is separately directed to systems and methods that add thresholds so that amplitude or intensity modulation can be used to move edges in the process direction for further flexibility in printing irrational or warpable screens.

Generating new values of a magnified sampling distance threshold array by interpolation permits multiple thresholds to be accessed and presented to multiple comparators to cause multi-bit output. This invention is separately directed to systems and methods that add thresholds so that amplitude or intensity modulation can be used to move edges in the process direction for enhanced flexibility in printing irrational or warpable halftone screens.

The following detailed description of the exemplary embodiments of this will be presented in view of a raster output scanner (ROS) image forming apparatus. However, it should be appreciated that the systems and methods of this invention, as described herein, can be applied to an image forming apparatus that uses a page width print bar and/or any other known or later-developed stimulus generating device and/or that uses any type of stimulus, including any type of projected radiation of any wavelength, a spatially-modulated magnetic field and/or magnetic flux, a spatially-modulated applied electric potential, spatially-modulated applied heat energy, a spatially modulated direct application of toner, ink or other material used to create an image, or any other known or later developed technique, medium and/or material used by an image forming apparatus to form either a developed image and/or a latent image that is subsequently developed.

Thus, it should be appreciated that, while the following detailed description refers primarily to a raster output scanner that scans one or more light beams across a photoreceptor drum or belt, this description is intended to be exemplary only and not limiting in any way of the systems and methods according to the invention discussed herein.

Similarly, the following detailed description will primarily refer to a halftone dot as forming the image element. However, it should be appreciated that any image element structure, such as text, lineart and the like, could be formed using the systems and methods of this invention disclosed herein. Thus, it should be appreciated that the references to a halftone dot herein are intended to be exemplary only and not limiting of the scope of this invention.

Figure 1:
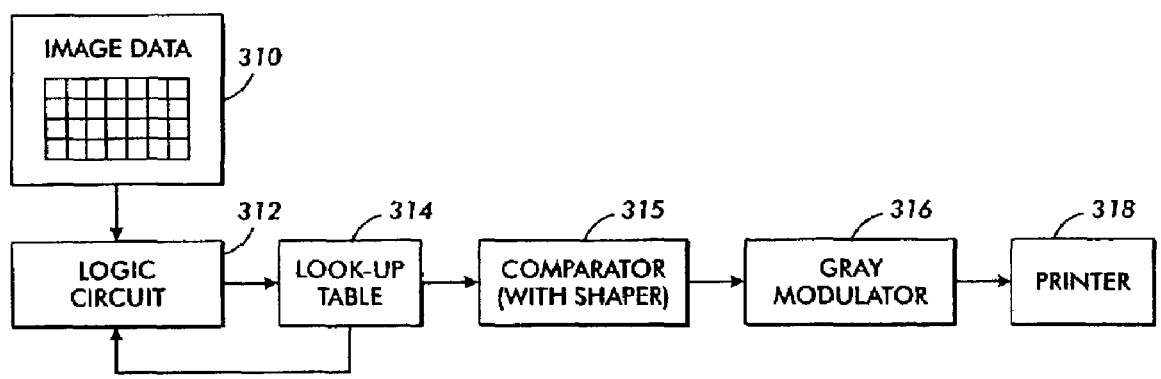
FIG. 1 shows a block diagram of a threshold array halftoner printing system usable with the systems and methods of the invention.

With reference to FIG. 1, an input image 310 to be processed is represented by a set of gray signals (gray pixels) arranged in an array of scanlines. Each scanline contains a plurality of gray pixels each defining an optical density level varying between a minimum and a maximum value. Each pixel is therefore defined by its optical density and position in the image. Gray values or levels for gray pixels are typically expressed as integers, with one example falling in the range from zero to 255, although greater or lesser number of levels, as well as non integer representations, are possible. An output image comprises a plurality of pixels, each pixel corresponding to a printer signal that will drive a printer, a display device, or any other appropriate known or later-developed image output terminal, to produce a spot.

In various exemplary embodiments of the type of system to which the systems and methods according to this invention can be applied, the pixel information from the image data 310 is provided to a logic circuit 312. The logic circuit 312 provides the fast scan and slow scan addresses to a lookup table (LUT) 314 by adding increments of a sparse sampling distance centers to each accumulated distance. The pixel values are then compared in a comparator 315, which includes a shaper, with the multiple threshold values that are stored in the determined lookup table address to produce multiple binary values to be sent to a gray modulator 316. The look-up table 314 supplies a closest-fit high addressability mark corresponding to a binary data value for each pixel of the current pixel group. The binary data values are sent directly to a printer 318, for example, or indirectly through a gray modulator 316, and the corresponding halftone dots are output to a printer 318.

In various exemplary embodiments, the look-up table 314 can feed back a new error value that will be propagated to one or more pixel groups. An error occurs when the effective image value determined for the pixel group differs from the actual image value defined by the determined binary data values. For example, if there is a need to print a smaller area than the defined area for the target printer, the smallest defined area will be printed and the excess value will be propagated to the next pixel group as an error. Thus, error is the difference between what was actually printed and the total sum of what is desired to have been printed. By including this error diffusion technique of propagating an error along the fast scan direction, the actual image density over several dots is closer overall than without this error diffusion technique.

Figure 2:
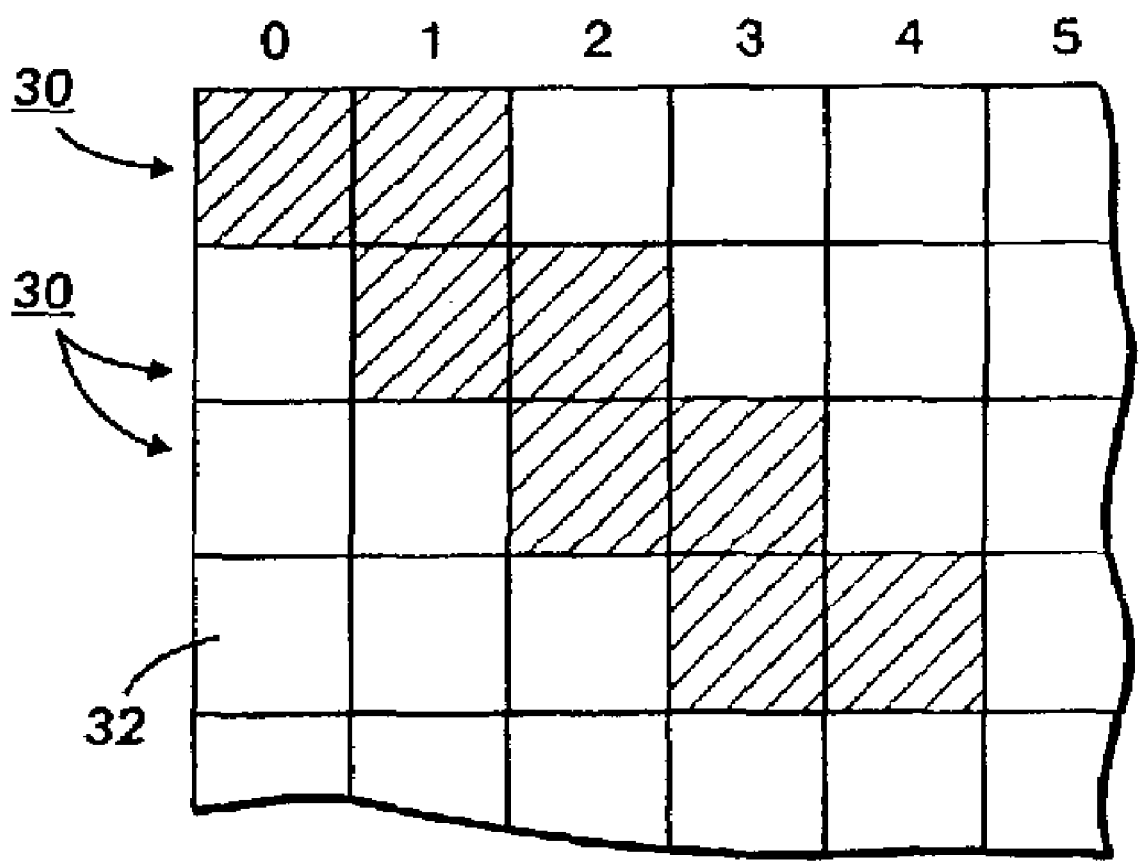
FIG. 2 shows an exemplary embodiment of an array of image data represented by lines of input data pixel sized objects.
Figure 3:
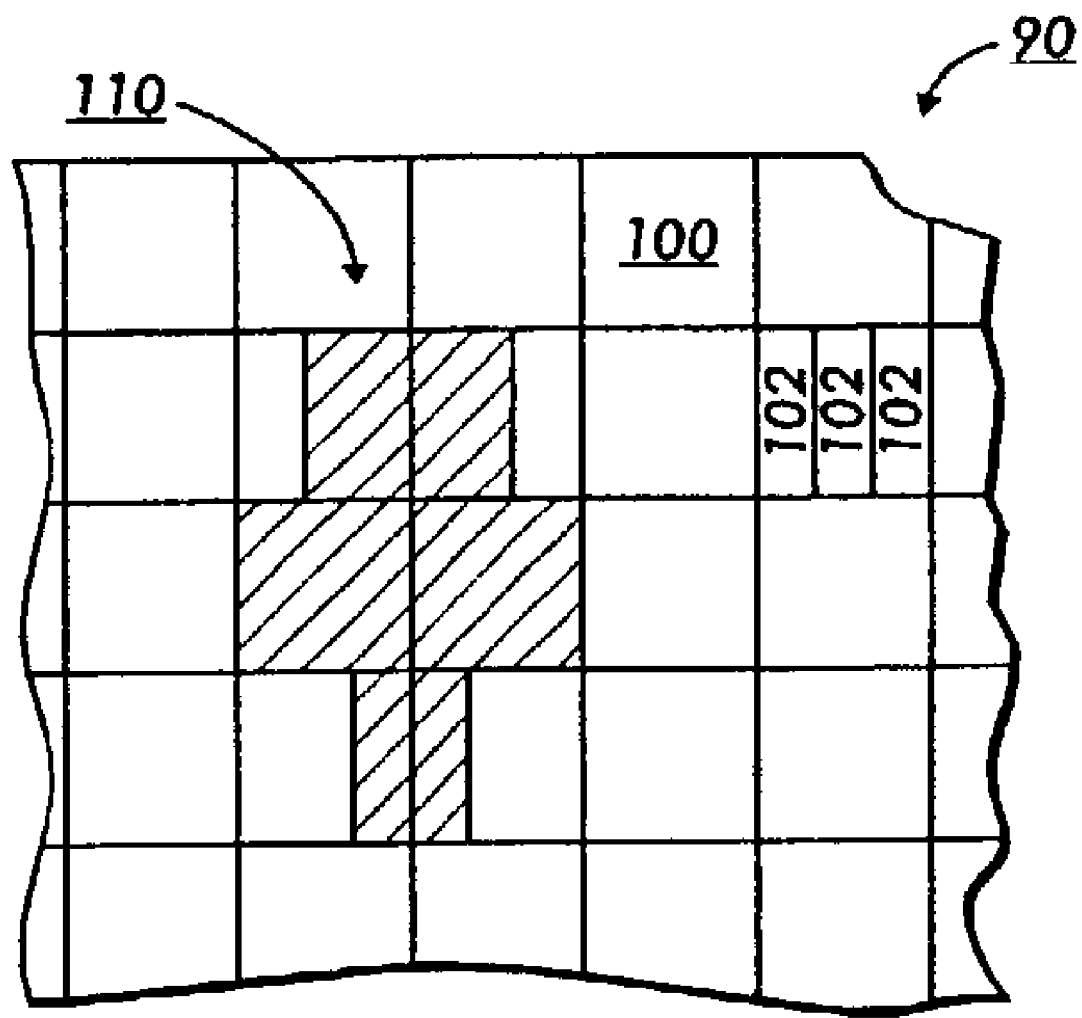
FIG. 3 shows an exemplary embodiment of a data array output produced by a halftoner according to this invention.

With reference to FIGS. 2 and 3, the image data of FIG. 2 is represented by a plurality of scanlines 30. Each scanline 30 is formed by a plurality of image input pixels 32. Exemplary pixel groups are represented by the shaded pixels. FIG. 3 shows one exemplary embodiment of the output data on an output data array 90 that may produced by one exemplarity embodiment of a halftoner according to this invention. The output data array 90 has a number of representative pixel-sized objects 100 that are divided into a number of addressability units 102. The addressability units 102 are defined and described in the incorporated 162 patent. The addressability units 102 correspond to an array of device pixels and to a number of gray units. For example, if there are three addressability units per scanline, this allows for three subscanline edge opportunities per scanline.

As noted above, the representative pixel-sized objects 100 are made up of a plurality of addressability units 102. The addressability units 102 in each representative pixel-sized object 100 correspond to an optical density level of a portion of the image data represented by the corresponding halftoner memory location. Representative pixel values correspond to grayscale image data. For printing by the printer 318, the grayscale image data is converted to binary data. The look-up table 314 is used to achieve the conversion in real time. FIG. 3 shows a halftone dot 110 of overlayed output data in the output data array 90, the halftone dot 110 taking up all or part of six representative pixel-sized objects 100, in this example.

In various exemplary embodiments, such as that shown in FIG. 1, the summed sparse sampling distances determine the lookup table address. The addressability unit values could be determined on the fly, but such determinations would use several clock cycles. In various exemplary embodiments, for greater speed, the addressability unit values are predetermined and stored in a single memory location in the halftoner or in a look-up table can be addressed in a single clock cycle.

The sparse sampling distances are used to address the memory. The memory locations may be addressed one at a time, although several memory locations are usually addressed at one time, and are not necessarily interpolated, but may be interpolated, such as, for example, if warping is performed. Various exemplary embodiments of the systems and methods according to this invention increment by one memory location or scan at a time when producing various halftone angles and frequencies, where the sparse sampling distance is fractional.

FIG. 4 shows a combined lookup table sampled on nominal 3×3 centers, skipping over unused halftone memory locations and the memory content of a halftone memory location;

Each threshold memory location center illustrated in FIG. 4, is individually compared with the input intensity value (I) from the image to be reproduced and i is the value to be turned on or off according to the following rule:

$$\text{if}(I \geq T) \rightarrow i = 0;$$
$$\text{otherwise,} i = 1.$$

It should be appreciated that I=0 is an exception, and results in i=1. However, when i=1, the output/device pixel is dark, which is an intensity I=0).

FIG. 4 shows the combined lookup table sampled nominally on 3×3 centers, skipping over unused cells. Each sample provides three output bits by accessing three 8-bit thresholds simultaneously, where T1 is the threshold for a previous memory location, T2 is the threshold for a current memory location, and T3 is the threshold for a next memory location. The three thresholds T1-T3 are compared, using one or more of the one or more threshold comparators 340, with the intensity value of the current pixel to convert that intensity value to a binary triplet for printing directly, or indirectly through the gray modulator 316. Binary triplets are shown in FIG. 4 to the right of the halftone dot lookup table illustration. The three thresholds accessed at a memory location produce the binary triplet as a result of a thresholding operation. If, for example, the memory were to be sampled on 10×10 centers corresponding to a 10-times magnification, 10 comparisons would be performed for this sampling event, and 10 output bits would be generated. It should be appreciated that, in various exemplary embodiments, these comparisons may be performed simultaneously.

FIG. 5 shows a threshold array halftoner with a magnified sampling distance that has been magnified by 3 relative to the conventional single memory location scan distance. It should be appreciated that in the halftoner, each memory location represents a single addressability unit in the fast scan direction. Thus, the scanlines, which were adjacent to each other with a sampling distance of one memory location, are now three memory locations apart. Because of this, the scans only sample one-third of the memory locations in the slow scan direction. The same is true for the fast scan direction, making any given halftone dot produced by approximately one-ninth of the available memory locations.

A magnification or sampling distance of 3 causes the scan phase to be definable in 3 different phases, illustrated as the phases A, B and C, in the slow scan direction, as shown in FIG. 5. That is, the phases A-C illustrate the dot shapes that would be output if that phase were used by the halftoner. The first phase A and the third phase C represent the two interpolated values for phase B, and reduce the error in sampling when the second phase B is not accessed. The three interpolated shapes shown in FIG. 5 can be combined into one shape, as illustrated in FIG. 6. It should be also be noted that there are also three phases, identified as phases L, M and N in FIG. 7, in the fast scan direction, and the three correct output bits for these three fast-scan phases are also easily packed together for output. FIG. 7 shows the dot shapes that result when using the scan phases L and M in the fast scan direction.

In various exemplary embodiments of the systems and methods of this invention, up to 9 different dot shapes can be overlaid into the shape shown in FIG. 6 for a 3×3 implementation, emulating a supercell clustered halftone. FIG. 8 shows the nine different dot shapes. The rows of FIG. 8 show views of light beam scan phases A1-A3, B1-B3 and C1-C3, as in FIG. 4, in the slow scan direction and the columns show three separate fast scan phases as in FIG. 7.

For a 10×10 implementation, up to 100 different dot shapes could be overlaid. Threshold array halftoner accumulators are described in detail in the incorporated 414 patent. Since the threshold array halftoner accumulators are incremented with sparse sampling accumulands, which have fractional values, and because there is a requirement for halftone screen at any frequency and any angle, the scan access will typically roll through all three phases periodically as the image is made. This can create an irrational halftone. In general, the rendering data loaded into the threshold array desirably achieves the same exposure on the photoreceptor regardless of the phase in which the scan structure passes through the cell. This will be helped by (1) increasing the addressability in both the fast scan and slow scan directions to reduce, and ideally minimize, quantization error; and (2) overscanning, as disclosed in U.S. Pat. No. 5,138,339, which is incorporated herein by reference in its entirety, which allows better control of exposure edge placement in the process direction, or (3) use of the techniques of the incorporated 967 patent application.

As shown in FIG. 5, the scan pitch, which is the separation between the center of the laser beam and the center of the adjacent laser beam in the slow scan direction, is illustrated as the distance between the scans A1 and A2 or between the scans A2 and A3. The slow-scan phase on the stationary halftone thresholding grid is illustrated in FIG. 5 as the first phase A, the second phase B or the third phase C. Regardless of the phase, the resulting halftone shapes are designed to expose the same density and to have concentric centers of gravity with the other shapes. According to various exemplary embodiments of the systems and methods of this invention, the resulting halftone shapes are combined into one lookup table that can be accessed at any phase. Alternatively, if a halftone look-up table is not implemented, a set of equations that defines the halftone dot shape function can be implemented instead.

The exemplary embodiment shown in FIG. 5 is based on a magnification or sampling distance of 3 because it is relatively easy to show this magnification or sampling distance, although a greater sampling distance or magnification, such as, for example, 10 may be more appropriately used in an actual implementation. Moreover, although a magnification or sampling distance of 3 is illustrated in both directions, one may alternatively choose a different magnification or sampling distance to be used in each direction.

The three thresholds accessed at a given memory location produce a binary triplet as a result of a thresholding operation. Binary triplets can be produced and used in three thresholding operations, and the triplet is clocked out to the printer laser diodes at 3× sampling frequency. However, only one threshold may be produced and used for a lower resolution output.

FIG. 9 is a block diagram outlining one exemplary embodiment of a multibit threshold array halftone generating system 300 according to this invention. FIG. 9 requires a portion that accumulates the fast and slow sparse accumulands/increments, such as, for example, 2.9 fast and 3.1 slow, to produce a look-up table memory address. As shown in FIG. 9, the multibit threshold array halftone generating system 300 includes an input/output interface 305, a controller 320, a memory 330, one or more threshold comparators 340, and a logic circuit 312, each interconnected by one or more data and/or control busses or application programming interfaces (APIs) 360. It should also be appreciated that, in various exemplary embodiments, the one or more threshold comparators 340 and the logic circuit 312 can be implemented as portions of the controller 320. The lookup table 314, shown in FIG. 1, is stored in the memory 330 as the look up table 334.

The input/output interface 305 can be implemented using any known or later-developed hardware device or application programming interface structure usable to connect the multibit threshold array halftone generating system 300 to an image data source and/or an image data sink (not shown). In general, the multibit threshold array halftone generating system 300 can be implemented within the overall data processing system of an image forming apparatus, such as a laser printer, an inkjet printer, a digital copier, a facsimile machine, or the like. Alternatively, the multibit threshold array halftone generating system 300 can be implemented as a hardware and/or software system executing on a general purpose computer or the like.

The image data source can be a locally or remotely located computer, a digital camera, a scanner, the scanner subsystem of a digital copier, a facsimile machine, or any known or later developed device that is capable of generating grayscale electronic image data. Similarly, the image data source can be any suitable device that stores and/or transmits grayscale electronic image data, such as a client or a server of a network. The image data source can be integrated with the multibit threshold array halftone generating system 300, as in a digital copier having an integrated scanner. Alternatively, the image data source can be connected to a device in which the multibit threshold array halftone generating system 300 is implemented over a connection device, such as a modem, a local area network, a wide area network, an intranet, the Internet, an extranet, any other distributed processing network, or any other known or later developed connection device.

It should also be appreciated that, while the electronic image data can be generated at the time of printing an image from original physical document, the grayscale electronic image data could have been generated at any time in the past. Moreover, the grayscale electronic image data need not have been generated from an original physical document, but could have been created electronically. The image data source is thus any known or later developed device which is capable of supplying grayscale electronic image data to the multibit threshold array halftone generating system 300.

Similarly, the image data sink can be any known or later developed device that is capable of receiving the halftone electronic image data generated by the multibit threshold array halftone generating system 300 from the grayscale image data received from the image data source, and either storing, transmitting, and/or displaying the halftone grayscale image data. Thus, in general, the image data sink can be any device that is capable of outputting and/or storing the halftone electronic image data generated according to the systems and methods of this invention, such as a printer, a digital copier, any other known or later developed image forming device, a facsimile device, a display device, a memory, or the like.

The memory 330 includes one or more of a current intensity value portion 331, a halftone value threshold portion 332, a threshold comparator portion 333, and a look-up table 334, and any other appropriate functionally distinct portion of the memory 330. The memory 330 and the various memory portions 331-334 can each be implemented using any desired combination of non-alterable, non-volatile memory, alterable and non-volatile memory and alterable and volatile memory. Thus, the memory 330 can be implemented using any appropriate combination of alterable, volatile or non-volatile memory, or non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory, a memory stick, or the like. Similarly, the non-alterable or fixed memory can be implemented using any one or more of ROM, PROM, EPROM, EEPROM, and ROM disk, such as a CD-ROM or DVD-ROM disk, and disk drive or the like.

Moreover, it should be appreciated that the multibit threshold array halftone generating system 300 can be implemented as software executing on a programmed general purpose computer, a special purpose computer, a microprocessor or the like.

In this case, the multibit threshold array halftone generating system 300 can be implemented as one or more routines or software elements or objects embedded in a printer driver, as a set of resources residing on a server, or the like. The binary clustered irrational halftone dot generating system 300 can also be implemented by physically incorporating it into a software and/or hardware system such as a hardware and software systems of a printer or digital photocopier.

This threshold array halftoner provides multi-bit, sampled gray output with arbitrary dot shapes that can be irrational, rotated or warped, clustered or gray edged, and typically uses less memory that a hyperacuity halftoner, such as that disclosed in U.S. Pat. No. 5,485,219 which is incorporated herein in its entirety.

FIG. 10 shows a sampling grid which samples four (4) periods of the lookup table halftoner dot at different phases. The original halftone dot which is produced using just one phase is shown in the lower right hand quadrant of FIG. 10. In this exemplary embodiment, the systems and methods according to this invention have produced four halftone dots, which include the original halftoner dot in the lower right quadrant and the three additional dots, one of which is in each of the other four quadrants of FIG. 10. The halftone dot shown in the upper right quadrant of FIG. 10 has its center of gravity displaced upward by one memory location with respect to the sampling grid relative to the halftone dot shown in the lower right hand quadrant of FIG. 10. The halftone dot shown in the upper left hand quadrant of FIG. 10 has its center of gravity displaced upward by one memory location with respect to the sampling grid relative to the halftone dot shown in the lower right hand quadrant of FIG. 10. The halftone dot shown in the lower left hand quadrant of FIG. 10 has its center of gravity displaced leftward by one memory location with respect to the sampling grid relative to the halftone dot shown in the lower right hand quadrant of FIG. 10. The sampling of all three memory locations, i.e., the last, current and next, which has been denominated binary triplet scanning, is stored in the current memory location, as shown in FIG. 8, and described, above, in connection with FIG. 8.

FIG. 11 shows the resulting overlayed output data based on the lookup table sampled as shown in FIG. 10. That is, in this exemplary embodiment of the systems and methods according to the invention, the binary triplet scanning results in the halftone overlayed output data shown in FIG. 11. The differences in the overlayed data in the four quadrants results from the sampling differences in the four quadrants of FIG. 10.

FIG. 12 illustrates one exemplary embodiment of a lookup table (LUT) sampling grid rotated at an arbitrary angle with respect to the columns and rows of the lookup table. As discussed above, two dimensional array accesses can be within a rotated coordinate system with respect to the pixel scan line coordinate system, where the x and y components of the magnified increments will correspond the cosine and sine of the access angle, and the hypotenuse length will correspond to the magnification factor or sparse sampling distance.

FIG. 13 is a flowchart outlining first exemplary embodiment of a method according to this invention usable to obtain multi-bit output used to modulate the light beam in order to get the modulation data for the light beam as it travels along the scan line that results in improved halftoning.

Thus, as shown in FIG. 13, beginning in step S100, operation continues to step S110, where a threshold array is selected. One exemplary embodiment for selecting the threshold array is disclosed in the incorporated 289 patent. Then, in step S120, the selected threshold array is magnified and sparsely sampled using a specified sampling distance and magnification factor, such as, for example, 3 addressability units, and the intermediate values are generated by interpolation to create a threshold look-up table having a magnified sampling distance with clustered multibit output. Next, in step S130, halftone shapes are created based on the multibit output. Operation then continues to step S140.

In step S140, the resultant halftone shapes are combined into a lookup table accessible at any phase. Next, in step S150, different phase dot shapes are overlaid into the lookup table. Then, in step S160, the combined lookup table created is sampled based on a selected sparse sampling distance center. Next, in step S170, multiple 8-bit thresholds, such as, for example 2, 4 or 8, are accessed for each sampled threshold look-up table memory location to provide multiple output bits. It should be appreciated that, in various exemplary embodiments, in step S170, these multiple 8-bit thresholds are accessed simultaneously. Operation then continues to step S180.

In step S180, a comparison is made between the each of the multiple thresholds and current image intensity. Next, in step S190, the comparison data is converted to a binary triplet and forwarded to the printer. Then, in step S200, the image data is printed based on the binary triplet comparison data. Control then proceeds to step S210, where the process stops.

FIG. 14 is a flow chart outlining a second exemplary embodiment of the method according to this invention, in which amplitude or intensity modulation is used. In FIG. 14, beginning in step S300, operation continues to step S310. In step S3200, the halftone shapes are created based on the multibit output and variable threshold values. In various exemplary embodiments, variable threshold values, such as, for example, ⅓ power, ⅔ power and full power, are used to produce edges that can moved in the process direction, such as those shown in FIG. 14. This amplitude or intensity modulation technique can be used to "stair step" the way around mostly horizontal halftone shapes, for example, for more accurate reproduction. Next, in step S3300, halftone shapes are created with the more accurate amplitude or intensity modulated edges. Operation then continues to step S340.

In step S340, the resultant halftone shapes are combined into a lookup table accessible at any phase. Next, in step S350, different phase dot shapes are overlaid into the lookup table. Then, in step S360, the combined lookup table is sampled based on a selected sparse sampling distance center. Operation then continues to step S370.

In step S370, multiple 8-bit thresholds are accessed simultaneously for each sampled threshold look-up table memory location to provide multiple output bits. Operation then continues to step S380. Then, in step S380, a comparison is made between the multiple thresholds and current image intensity. Next, in step S390 the comparison data is converted to a binary pattern, such as, for example, a binary pattern if three 8-bit thresholds are accessed, and forwarded to the printer. Then, in step S400, the resulting image data, created based on the binary triplet comparison data, is used, such as, for example, by being printed. Control then proceeds to step S410, where the process stops.

FIG. 15 shows an exemplary embodiment of a halftone dot formed using amplitude or intensity modulation according to the systems and methods of this invention. FIG. 15 implements amplitude or intensity modulation to a threshold array halftoner using plural thresholds. Amplitude or intensity modulation adjusts the power or quantity of the light, allows gray values to be used on mostly horizontal edges of marks which are to be reproduced by halftoning, and can move the mark edge by fractions of a scan. The amplitude or intensity can be adjusted by several methods, such as, for example, pulse amplitude modulation (PAM), dithering, pulse width modulation, laser power adjustment, digital-to-analog conversion, intensity modulation, and any other appropriate known or later-developed type of modulation. Amplitude or intensity modulation methods adjust the average flux per unit of time that expose the media. The flux itself may be photonic, magnetic, electric charge, heat, molecules, among others, depending on the method of printing employed.

For instance, the edge of a mark can be moved by ⅓ scan pitch in the slow scan direction by applying ⅓ power to the laser at that particular edge. To accomplish this, three threshold values, instead of one, must be accessed for each of the last, current and next thresholds in each memory location. The first amplitude modulation threshold is the threshold value for which ⅓ power is applied; the second amplitude modulation threshold is the threshold value for which ⅔ power is applied; and the third amplitude modulation threshold is the threshold value for which 3/3 power is applied. A larger threshold would have priority over any smaller threshold. By adding the extra two thresholds for the ⅓ and ⅔ light beam power, respectively, to each of the full power thresholds, so that each cell contains 9 threshold values, the power associated with each threshold turn-on can be controlled to produce halftone dot edges that can be moved in the slow scan direction. This can be used to "stair step" the way around mostly horizontal halftone shapes, for example, for more accurate reproduction of an original.

The dashed line in FIG. 15 represents an arbitrary shape of a halftone dot. Each memory location has three stored thresholds, resulting in four power ranges, to wit: 0; ⅓; ⅔; and 3/3. Power levels shown in the boxes (0, ⅓, ⅔ and 3/3) results from comparing input memory location value (which makes the size of the radius of the dotted line, for example) with its position in the power ranges. Halftone dot memory locations within the dashed line result mainly from 3/3 laser power levels. Halftone dot memory locations immediately outside of the dotted line result mainly from ⅔ laser power levels, and halftone dot memory locations decrease to ⅓ and them to 0 laser power levels the farther they are outside of the dashed line. FIG. 15 shows only the process direction phase B memory levels. There are two more process direction phases to obtain all possible phases of the laser with respect to the halftone dot. Each memory location can contain the 3+3+3=9 thresholds, i.e., 3 thresholds for the previous memory location, 3 thresholds for the current memory location, and 3 thresholds for the next memory location to fill out its data set for sparse sampling.

FIG. 16 shows the sampling grid which samples/hits only one LUT memory location in 9 memory locations, FIG. 17 shows the sampling grid of FIG. 16 overlaid on the LUT memory to create FIG. 15, which is a halftone dot. In FIG. 15, the laser power can be 0, ⅓, ⅔ or 3/3 intensity. When the laser power intensity is ⅓ edge of the halftone dot takes up an intermediate position at that fractional distance in the process direction, which is shown in FIG. 15.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for generating a multi-bit output sampled threshold array halftone image from grayscale data, comprising:
    determining a grayscale image value to be represented by a binary clustered halftone dot,
    determining a nominal halftone dot shape within a halftone memory cell based on the determined grayscale image value using a threshold array,
    accessing multiple thresholds to obtain a multi-bit output sub-sample of the threshold array at the resolution of the image, and
    presenting the halftone image.

2. The method of claim 1, wherein accessing thresholds is done using multiple comparators.

3. The method of claim 1, wherein the sampling resolution of the threshold array is higher than the resolution of the image.

4. The method of claim 1, wherein the sampling resolution is the resolution of the image.

5. A method for generating a multi-bit output sampled threshold array halftone image from grayscale data, comprising:
    determining a grayscale image value to be represented by a binary clustered halftone dot;
    determining a nominal halftone dot shape within a halftone memory cell based on the determined grayscale image value using a threshold array; and sub-sampling the halftone cell at something other than an integer increment; and presenting the halftone image.

6. The method of claim 5, further comprising adjusting the sampling distance in small magnified increments of a magnified distance to permit warping of threshold array halftone dots.

7. The method of claim 5, further comprising adding thresholds to the threshold array to permit amplitude or intensity modulation can be used to move edges in the slow scan or process direction.

8. The method of claim 5, wherein the subsampling involves an enlarged or magnified increment from pixel to pixel.

9. The method of claim 8, wherein the enlarged increment from pixel to pixel is an integer.

10. The method of claim 8, wherein the enlarged increment from pixel to pixel is a non-integer.

11. The method of claim 5, further comprising interpolating threshold values in between magnified threshold array locations.

12. The method of claim 5, further comprising using pulse amplitude modulation to move a halftone dot shape in a slow scan direction.

13. A method for generating a multi-bit output sampled threshold array halftone image from grayscale data, comprising:
    determining a grayscale image value to be represented by a binary clustered halftone dot;
    determining a nominal halftone dot shape within a halftone memory cell based on the determined grayscale image value using a threshold array;
    sub-sampling the threshold array at distinct locations separated by a magnified distance; and
    presenting the halftone image.

14. The method of claim 13, further comprising adjusting the sampling distance in at least one fractional distance portion of the magnified distance.

15. An apparatus that generates a multi-bit output sampled threshold array halftone image from grayscale data, comprising:
    an intensity determiner that determines a grayscale image value to be represented by the binary halftone dot;
    a shaper that determines a nominal halftone dot shape within a halftone cell based on the determined grayscale image value using a threshold array; and
    a comparator to sub-sample the halftone cell at something other than an integer increment.

16. An apparatus that generates a multi-bit output sampled threshold array halftone image from grayscale data, comprising:
    an intensity determiner that determines a grayscale image value to be represented by the binary halftone dot;
    a shaper that determines a nominal halftone dot shape within a halftone cell based on the determined grayscale image value using a threshold array, and
    at least one comparator that accesses multiple thresholds and that compares the grayscale image value to the accessed threshold values of the threshold array to obtain a multi-bit output.

17. The apparatus of claim 16, further comprising a sub-sampler which samples the threshold array at distinct array locations separated by a magnified sampling distance.

18. The apparatus of claim 17, further comprising an adjustor that adjusts the sampling distance in at least one fractional distance portion of the magnified distance.

19. The apparatus of claim 17, further comprising an interpolator which interpolates threshold values in between magnified threshold array locations.

20. The apparatus of claim 16, further comprising an adder that adds more thresholds to the threshold array.

21. The apparatus of claim 16, further comprising a modulator that uses amplitude or intensity modulation to move a halftone dot shape in a process direction.

22. An apparatus for generating a sampled threshold array halftone image from grayscale data, comprising:
    a setter that sets a halftone sampling distance for a threshold array to a value greater than one;
    an interpolator that interpolates values within the threshold array with the altered sampling distance from halftone dot shape functions;
    and a sub-sampler that samples halftone threshold locations by an increment of other than one to produce a halftone dot image.

23. The apparatus of claim 22, wherein the increment is ten.

24. The apparatus of claim 22, wherein the increment is 3.1.

25. The apparatus of claim 22, wherein the increment is x.9 where x is an integer.

26. The apparatus of claim 22, wherein the increment is x.1 where x is an integer.

27. The apparatus of claim 22, further comprising a warper that warps the sampling increment.

28. The apparatus of claim 22, further comprising a multiple threshold accessor that accesses multiple threshold array values from the interpolator to produce multi-bit output.

29. The apparatus of claim 28, further comprising multiple comparators that receive multiple thresholds accessed by the multiple threshold accessor.

30. The apparatus of claim 22, further comprising a thresholder that adds halftone thresholds to moves halftone dot edges using amplitude or intensity modulation of the halftone dots.

31. A method of generating a sampled threshold array halftone image from grayscale data, comprising:
    setting a halftone sampling distance for a threshold array to a value greater than one;
    interpolating values within the threshold array with the altered sampling distance from halftone dot shape functions;
    sub-sampling halftone threshold locations by an increment of other than one to produce a halftone dot image; and
    presenting the halftone image.

32. The method of claim 31, wherein the increment is ten.

33. The method of claim 31, wherein the increment is 3.1.

34. The method of claim 31, wherein the increment is x.9 where x is an integer.

35. The method of claim 31, wherein the increment is x.1 where x is an integer.

36. The method of claim 31, further comprising warping the sampling increment.

37. The method of claim 31, further comprising accessing multiple threshold array values to produce multi-bit output.

38. The method of claim, 31, further comprising: accessing multiple thresholds; and presenting the accessed multiple thresholds to multiple comparators.

39. The method of claim 31, further comprising: adding halftone thresholds; and moving halftone dot edges using amplitude or intensity modulation of the halftone dots.

* * * * *